(12) United States Patent
Denhez et al.

(10) Patent No.: US 11,796,822 B2
(45) Date of Patent: Oct. 24, 2023

(54) MODULAR HEAD-MOUNTED DEVICE

(71) Applicant: MICROSOFT TECHNOLOGY LICENSING, LLC, Redmond, WA (US)

(72) Inventors: Nicolas Denhez, Seattle, WA (US); Paul Andrew Bosveld, Seattle, WA (US); Louis Berger, Munich (DE); Young Duk Song, Bellevue, WA (US); Erik Holverson, Redmond, WA (US); Eric Witt, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/711,580

(22) Filed: Apr. 1, 2022

(65) Prior Publication Data

US 2023/0127396 A1  Apr. 27, 2023

Related U.S. Application Data

(60) Provisional application No. 63/272,678, filed on Oct. 27, 2021.

(51) Int. Cl.
  *G02B 27/01* (2006.01)
(52) U.S. Cl.
  CPC .... *G02B 27/0176* (2013.01); *G02B 2027/014* (2013.01); *G02B 2027/0138* (2013.01);
(Continued)

(58) Field of Classification Search
  CPC ........ G02B 27/0176; G02B 2027/0138; G02B 2027/014; G02B 2027/0174;
(Continued)

(56) References Cited

U.S. PATENT DOCUMENTS

2015/0309312 A1* 10/2015 Alton ................... G09G 3/001
                                                              345/592
2017/0045742 A1*  2/2017 Greenhalgh ....... G02B 27/0081
(Continued)

FOREIGN PATENT DOCUMENTS

EP       3896509 A1    10/2021

OTHER PUBLICATIONS

"International Search Report and Written Opinion Issued in PCT Application No. PCT/US22/044053", dated Jan. 4, 2023, 12 Pages.

*Primary Examiner* — Brent D Castiaux
(74) *Attorney, Agent, or Firm* — Newport IP, LLC; Han K. Gim (57) ABSTRACT

A modular sensor and display module comprises an enclosure with a rigid frame and front and back visor lens encapsulating sensors, waveguide optics, and display/projection devices that provide various functions for a typical head-mounted device. A front visor may conceal sensors and other components and may further provide dimming for holographic displays. The modular sensor and display module may include a standard interface for attachment to various fit systems, including, for example, headband, VR headset, glasses temples, helmet, and the like. A further module, such as a rear-attachment module, may be provided that can provide auxiliary compute, storage, and power resources for the modular sensor and display module.

20 Claims, 4 Drawing Sheets

(52) U.S. Cl.
CPC ............... *G02B 2027/0174* (2013.01); *G02B 2027/0178* (2013.01)

(58) Field of Classification Search
CPC .......... G02B 2027/0178; G02B 27/017; G02B 27/0172; G02B 2027/0156
See application file for complete search history.

(56) References Cited

U.S. PATENT DOCUMENTS

| | | | |
|---|---|---|---|
| 2017/0336641 A1* | 11/2017 | von und zu Liechtenstein | G06T 19/006 |
| 2020/0111259 A1* | 4/2020 | Sears | G02B 27/0172 |
| 2020/0201042 A1* | 6/2020 | Wang | G06F 3/147 |
| 2021/0325699 A1* | 10/2021 | Leibovici | G02B 5/23 |

* cited by examiner

MODULAR HEAD-MOUNTED DEVICE

PRIORITY APPLICATION

This application claims the benefit of and priority to U.S. Provisional Application No. 63/272,678, filed Oct. 27, 2021, the entire contents of which are incorporated herein by reference.

BACKGROUND

Virtual reality ("VR") devices enable users to view and interact with virtual environments. For example, a VR device might enable a user to explore a virtual environment. Augmented reality ("AR") devices enable users to view and interact with virtual objects while simultaneously viewing the physical world around them. For example, an AR device might enable a user to view the placement of virtual furniture in a real-world room. Various devices that enable either or both VR and AR and related types of experiences might be referred to generally as extended reality ("XR") devices. VR devices, AR devices, and XR devices may also be referred to as a near-eye device ("NED") or head-mounted device (HMD).

One drawback of XR devices is that they are typically designed and built for a particular type of user and/or user environment. For example, some designs may be lightweight, being designed for extended periods of wear, for example in an office environment. Some designs may be integrated with a protective helmet, such as devices that are intended to be used in a factory or construction environment. Yet others may be designed for use by specialists such as medical professionals, and thus are integrated with surgical accessories.

Multiple designs for various user environments can result in higher costs and various design and manufacturing challenges. It is with respect to these and potentially other considerations that the disclosure made herein is presented.

SUMMARY

Various techniques and systems are disclosed for providing a modular design for XR and other head-mounted devices that enable interchangeability and flexibility for such devices, enabling the devices to be easily adapted for a variety of user environments.

The present disclosure describes technologies for a modular sensor and display module that, in one embodiment, comprises an enclosure with a rigid frame and front and back visor lens encapsulating sensors, waveguide optics, and display/projection devices that provide various functions for a typical head-mounted device. A front visor may conceal sensors and other components, and may further provide dimming for holographic displays. The modular sensor and display module may include a standard interface for attachment to various fit systems, including, for example, headband, VR headset, glasses temples, helmet, and the like. In some embodiments, a further module, such as a rear-attachment module, may be provided that can provide auxiliary compute, storage, and power resources for the modular sensor and display module.

The use of such modular designs for head-mounted platforms can enable independent design and build of fit systems and auxiliary systems, providing users with the ability to mix and match modules to tailor a head-mounted system according to the user's needs.

Those skilled in the art will also appreciate that aspects of the subject matter described herein can be practiced on or in conjunction with other system configurations beyond those specifically described herein, including smartphones, smart watches, tablet computing devices, special-purposed hardware devices, network appliances, and the like.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

HMD devices typically project or otherwise provide the user's eyes with virtual images in conjunction with the user's surroundings. Various techniques and systems are disclosed for providing a modular design for XR and other head-mounted devices that enable interchangeability and flexibility for such devices to be easily adapted for a variety of user environments.

Turning to the figures (which might be referred to herein as a "FIG." or "FIGS."), additional details will be provided regarding the technologies disclosed herein with reference to the accompanying drawings that form a part hereof. The FIGS. show, by way of illustration, specific configurations or examples. Like numerals represent like or similar elements throughout the FIGS.

In the FIGS., the left-most digit(s) of a reference number identifies the figure in which the reference number first appears. References made to individual items of a plurality of items can use a reference number with another number included within a parenthetical (and/or a letter without a parenthetical) to refer to each individual item. Generic references to the items might use the specific reference number without the sequence of letters. The drawings are not drawn to scale.

Figure 1:
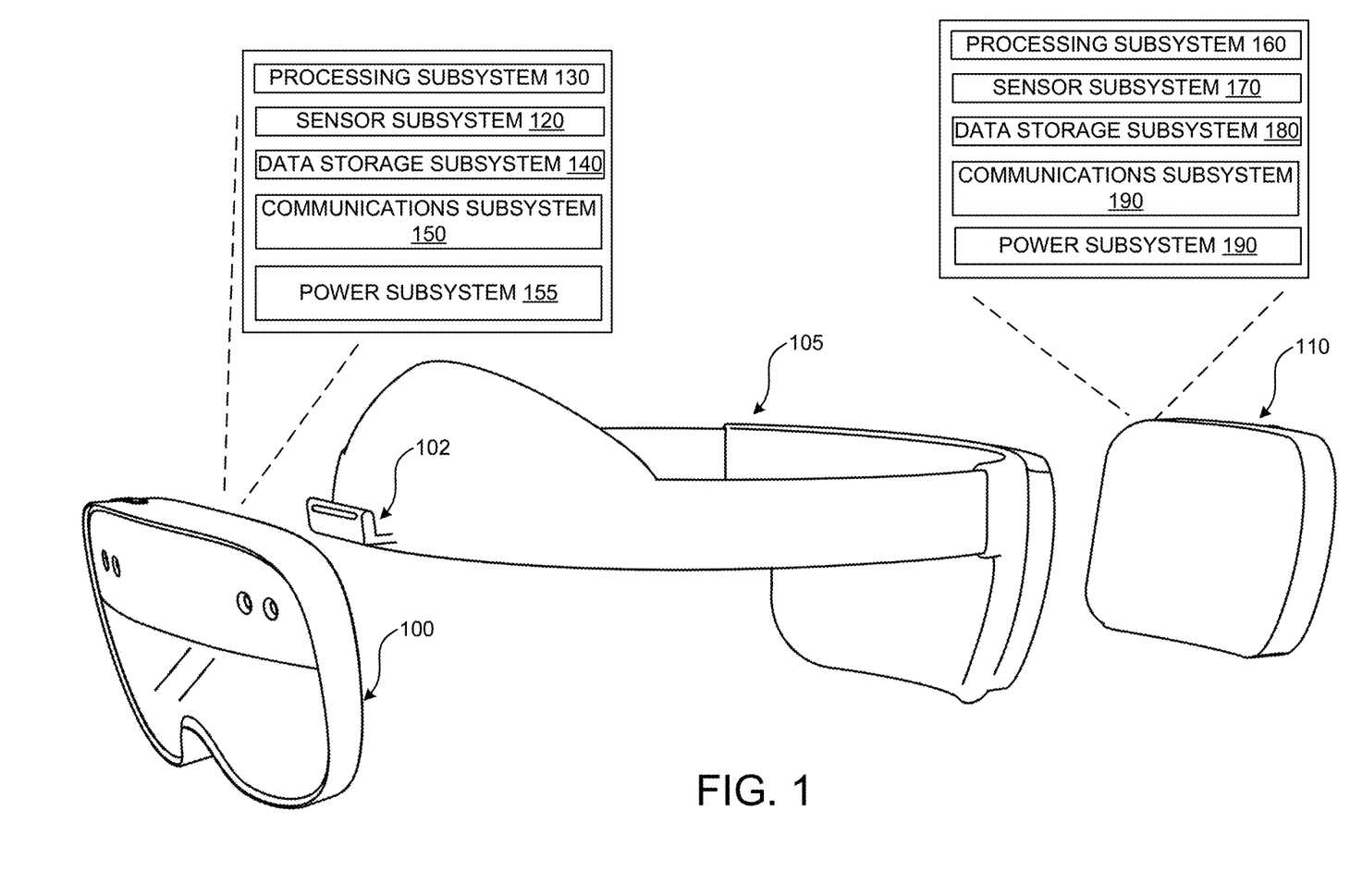
FIG. 1 is a computing device diagram showing aspects of a modular device that can be utilized to implement the various configurations disclosed herein.

FIG. 1 is a computing device diagram showing aspects of the configuration and operation of a modular device 100 that can be utilized to implement some of the various technologies disclosed herein. The modular sensor and display module 100, alone or in combination with one or more other devices, might form a system that performs or otherwise implements some of the features of various head-mounted devices described herein.

In the configuration shown in FIG. 1, the modular sensor and display module 100 takes the form of a modular and self-contained device and may be attachable to a modular fit assembly 105. It will be understood, however, that the modular sensor and display module 100 might take a variety of different forms other than the specific configuration depicted in FIG. 1. The modular fit assembly 105 may be configured for various users and user environments. For example, the modular fit assembly 105 may be configured to be worn on the head of a user.

FIG. 1 also illustrates an auxiliary module 110. The auxiliary module 110 may be adapted to be attachable to the modular fit assembly 105. The modular fit assembly 105 may be configured to provide various supplemental or auxiliary functions and may augment those provided by modular sensor and display module 100 or provide functions that are not provided in modular sensor and display module 100.

Although the configurations disclosed herein are discussed primarily in the context of AR and VR devices, it is to be appreciated that the technologies disclosed herein can also be utilized with MR devices and other types of devices that include, but are not limited to, smartphones, video game systems, tablet computing devices, and smartwatches.

The modular sensor and display module 100 may include one or more display panels (not shown in FIG. 1) that display computer generated ("CG") graphics. For example, the modular sensor and display module 100 might include a right-eye display panel for right-eye viewing and a left-eye display panel for left-eye viewing. A right-eye display panel is typically located near a right eye of the user to fully or partially cover a field of view of the right eye, and a left-eye display panel is located near a left eye of the user to fully or partially cover a field of view of the left eye.

In another example, a unitary display panel might extend over both the right and left eyes of a user, and provide both right-eye and left-eye viewing via right-eye and left-eye viewing regions of the unitary display panel. In each of these implementations, the ability of the modular sensor and display module 100 to separately display different right-eye and left-eye graphical content via right-eye and left-eye displays might be used to provide a user of the modular sensor and display module 100 with a stereoscopic viewing experience.

The modular sensor and display module 100 might include a variety of on-board sensors forming a sensor subsystem 120. The modular sensor and display module 100 might also include transceivers for communicating with other systems and networks. For example, and without limitation, the sensor subsystem 120 might include one or more outward facing optical cameras (not shown in FIG. 1) (e.g., cameras located on an external surface of the modular sensor and display module 100 and forward facing in a viewing direction of the user. The modular sensor and display module 100 can also include one or more inward facing optical cameras (not shown in FIG. 1) (e.g., rearward facing toward the user and/or toward one or both eyes of the user).

The sensor subsystem 120 can also include a variety of other sensors (not shown in FIG. 1) including, but not limited to, accelerometers, gyroscopes, magnetometers, environment understanding cameras, depth cameras, inward or outward facing video cameras, microphones, ambient light sensors, and potentially other types of sensors. Data obtained by the sensors, including the cameras of the sensor subsystem 120 can be utilized to detect the location, orientation (which might be referred to as a "pose"), and movement of the modular sensor and display module 100. The location, orientation, and movement of the modular sensor and display module 100 can be utilized to compute the view of the VR environment presented to the user by the modular sensor and display module 100. The location, orientation, and movement of the modular sensor and display module 100 can also be utilized to facilitate light-based communications as further described herein.

One or more outward facing optical cameras of the modular sensor and display module 100 can be configured to observe the real-world environment and output digital images illustrating the real-world environment observed by the one or more outward facing optical cameras.

The modular sensor and display module 100 might also include a processing subsystem 130 that includes one or more processor devices that perform some or all of the processes or operations described herein, as defined by instructions executed by the processing subsystem 130. Such processes or operations might include generating and providing image signals to the display panels, receiving sensory signals from sensors in the sensor subsystem 120 such as the transceivers 102, enacting control strategies and procedures responsive to those sensory signals. Other computing systems, such as local or remote computing systems might also perform some or all of the computational tasks disclosed herein.

The modular sensor and display module 100 might also include an on-board data storage subsystem 140 that includes one or more memory devices storing computer-executable instructions (e.g., software and/or firmware) executable by the processing subsystem 130, and might additionally hold other suitable types of data. The modular sensor and display module 100 might also include a communications subsystem 150 supporting wired and/or wireless communications with remote devices (i.e., off-board devices) over a communications network (not shown in FIG. 1). As an example, the communication subsystem 150 might be configured to wirelessly send or receive a video stream, audio stream, coordinate information, virtual object descriptions, and/or other information from remote devices to render virtual objects and textures on the integrated displays of the modular sensor and display module 100. Examples of VR devices include, but are not limited to, the HTC VIVE VR device and the OCULUS RIFT VR device.

In some implementations, the modular sensor and display module 100 may operate in conjunction with a controller, for example, for a video game system. The controller may, in some examples, include an onboard processor, storage system, and communication system. The controller may also include one or more input controls, such as a button, trigger, joystick, directional pad, touch screen, etc. The controller may comprise an inertial measurement unit (IMU) (which may include an accelerometer, gyroscope, magnetometer, and/or other suitable sensors) that provides output related to changes in position and orientation of the controller. In some examples, the modular sensor and display module 100 may also include an IMU to help track changes in the HMD pose in the environment.

In some embodiments, the modular sensor and display module 100 may be configured to communicate with other devices using RF, light-based, and other protocols, such as via a wireless network connecting utilizing a Bluetooth communication protocol, Li-Fi communication protocol, or other suitable wireless communication protocol to communicate with other devices and networks. In other embodiments, an optional host computing device (not shown) may communicate with the modular sensor and display module 100 to receive data from modular sensor and display module 100 (including data acquired or generated by the modular sensor and display module 100), to process such data, and to send control signals to these devices. It should be understood that while described herein in the context of specific communication protocols shown in the FIGS. are presented for the purpose of example, and any other suitable communications protocols, may be used for HMD-to-host communication.

The modular sensor and display module 100 typically needs information to determine where the user or the device is located in reference to the surroundings. Furthermore, the point of view of the modular sensor and display module 100 should be tracked. A tracking system may recognize movements and project the graphics related to the real-world environment the user is observing at any given moment. Various location determination methods may be used, including those that reference external systems such as GPS, as well as internal location estimation methods. The modular sensor and display module 100 may further be configured to recognize one or more items within captured images using object recognition.

The auxiliary module 110 might also include a variety of on-board sensors forming a sensor subsystem 170. The auxiliary module 110 might also include transceivers for communicating with other systems and networks. The modular sensor and display module 100 might also include a processing subsystem 160 that includes one or more processor devices that perform some or all of the processes or operations described herein, as defined by instructions executed by the processing subsystem 160.

The auxiliary module 110 might also include an on-board data storage subsystem 180 that includes one or more memory devices storing computer-executable instructions (e.g., software and/or firmware) executable by the processing subsystem 160, and might additionally hold other suitable types of data. The auxiliary module 110 might also include a communications subsystem 190 supporting wired and/or wireless communications with modular sensor and display module 100 as well as other remote devices (i.e., off-board devices) over a communications network (not shown in FIG. 1).

The modular sensor and display module 100 may be attached to modular fit assembly 105 via an attach point 102. The modular sensor and display module 100 may be attached using a locking mechanism, magnetic attachment mechanism, or other suitable mechanism for attaching to the attach point 102. The attach point 102 may also include an electrical, optical, or other connector to enable the modular sensor and display module 100 to be electrically or optically connected to the modular fit assembly 105. A similar attachment mechanism may be included in modular fit assembly 105 to allow attachment of the auxiliary module 110.

In some embodiments, the modular fit assembly 105 may be a flexible band. Additionally, while the attach point 102 is shown as a single assembly, it should be noted that additional attach points may be provided and in different configurations. For example, two attach points may be provided in which there is an attach point at either end of the modular sensor and display module 100.

In some embodiments, the modular sensor and display module 100 is self contained and includes full processing capability along with power to enable operation of the modular sensor and display module 100 without relying upon external sources. The auxiliary module 110 may provide additional computing, storage, power, and other resources that can be made available to the modular sensor and display module 100 when attached.

Figure 2:
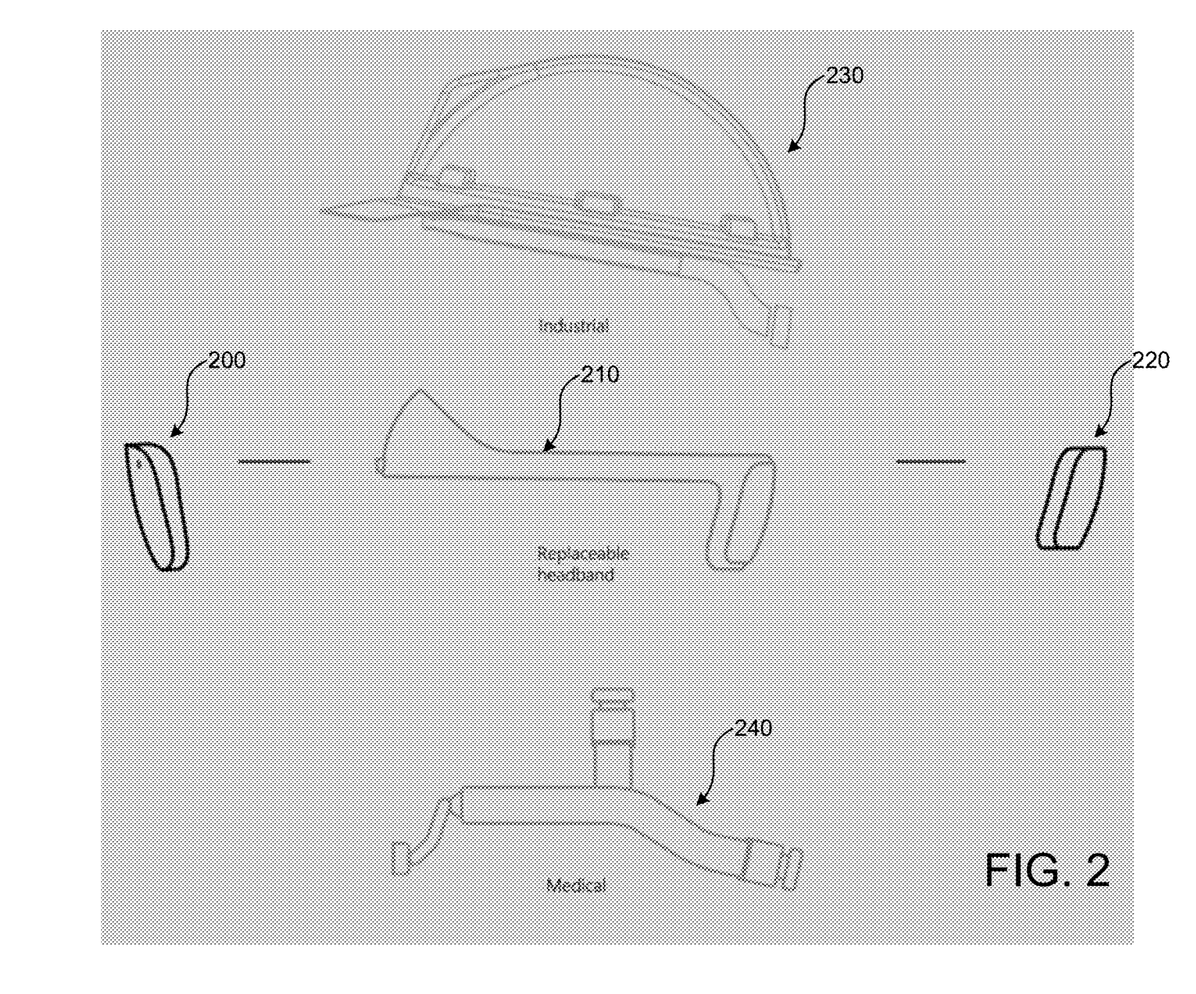
FIG. 2 is a diagram showing aspects of the configuration and operation of a modular device that can be utilized to implement the various configurations disclosed herein.

Referring to FIG. 2, illustrated is one example of an implementation of the modular techniques disclosed herein. A modular sensor and display module 200 may be configured to attach to modular fit assembly 210 which, in this example, provides a headband that may be worn by a user. The modular fit assembly 210 may be configured to attach to auxiliary module 220.

FIG. 2 also illustrates a modular fit assembly 230 that is designed for applications requiring a helmet as shown in the FIG. 2. Modular fit assembly 230 may include standard attach points such that modular sensor and display module 200 and auxiliary module 220 may interchangeably be attached to modular fit assembly 230 in a manner similar to modular fit assembly 210.

FIG. 2 also illustrates a modular fit assembly 240 that is designed for applications that may be used in a medical environment as shown in the FIG. 2. For example, the modular fit assembly 240 in this example can be designed for easy sterilization and/or easy disposal in between procedures. Modular fit assembly 240 may include standard attach points such that modular sensor and display module 200 and auxiliary module 220 may interchangeably be attached to modular fit assembly 240 in a manner similar to modular fit assembly 210 and modular fit assembly 230.

Figure 3:
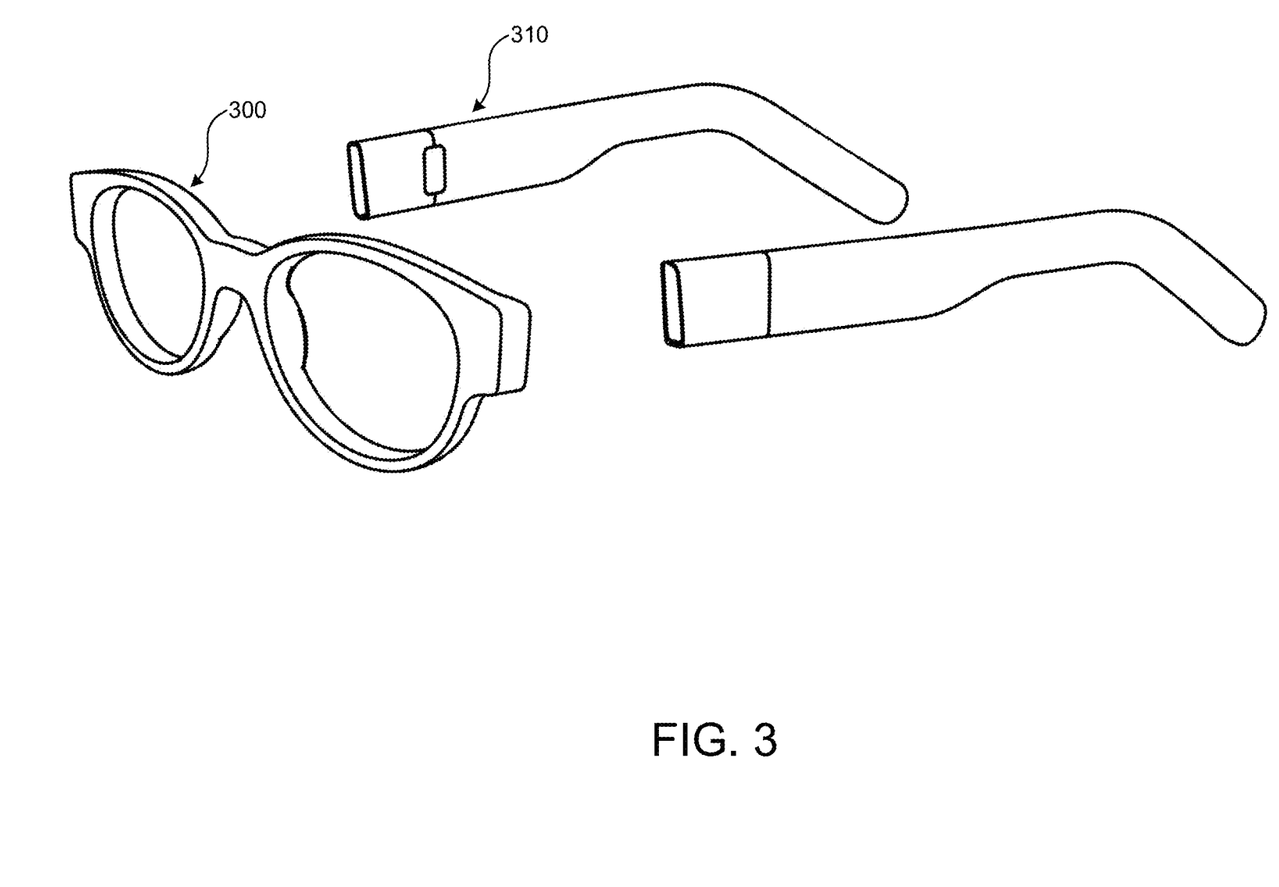
FIG. 3 is a diagram showing aspects of the configuration and operation of a modular device that can be utilized to implement the various configurations disclosed herein.

Referring to FIG. 3, illustrated is another example of a modular sensor and display module 300 that is adapted to an eyeglass design. The modular sensor and display module 300 may similarly include standardized attach points to enable attachment to a suitable modular fit assembly 310, which in this example includes two temple fit assemblies. In other examples, the modular fit assembly 310 may be flexible bands, or other suitable design.

Figure 4:
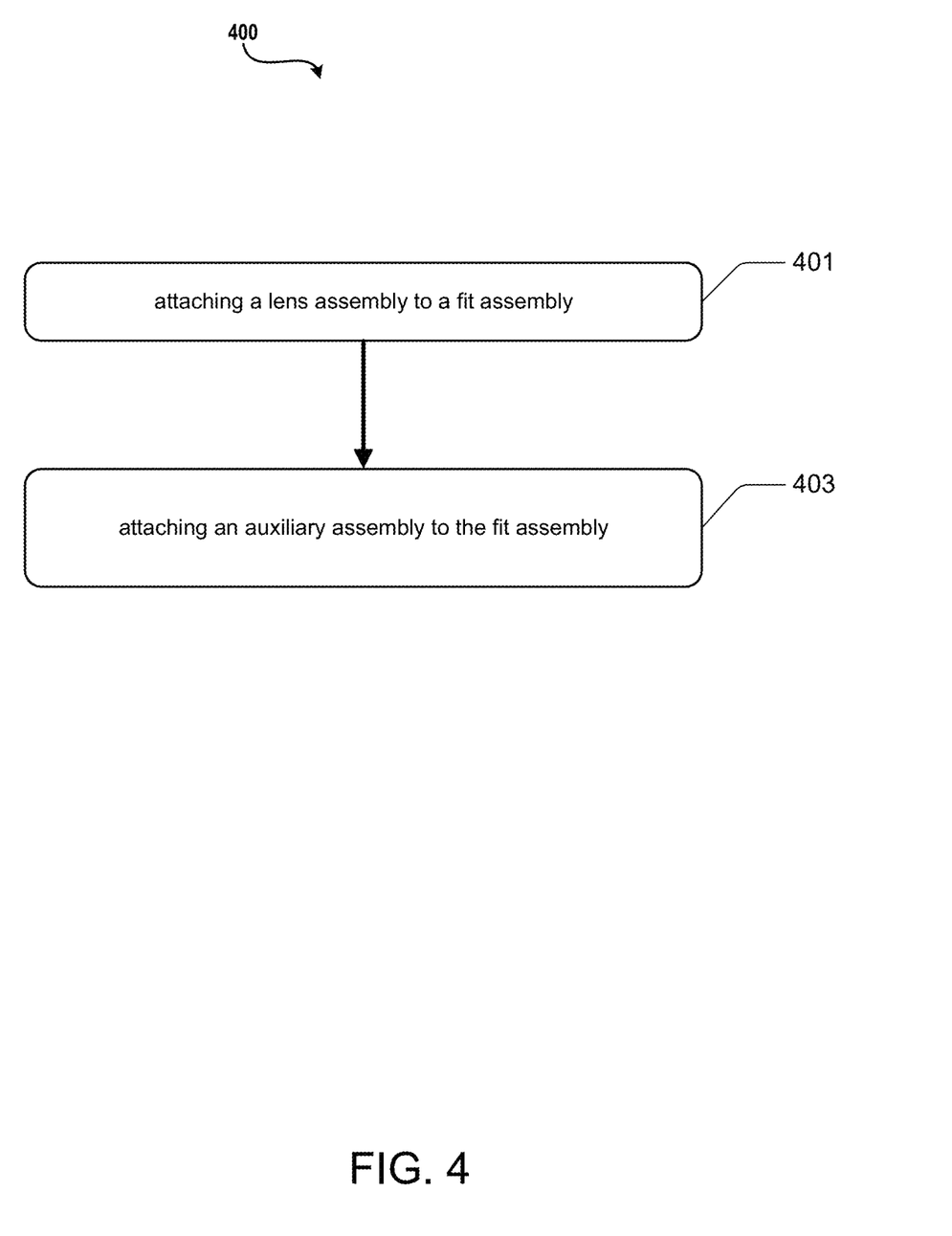
FIG. 4 is a flowchart depicting an example procedure for configuring a head-mounted device in accordance with the present disclosure.

FIG. 4 is a flow diagrams showing aspects of a routine disclosed herein for configuring a head-mounted extended reality device.

It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, personal computers, hand-held computing devices, microprocessor-based, programmable consumer electronics, combinations thereof, and the like. Although the example routine described below is operating on a computing device, it can be appreciated that this routine can be performed on any computing system which may include a number of computers working in concert to perform the operations disclosed herein.

Thus, it should be appreciated that the logical operations described herein are implemented (1) as a sequence of computer implemented acts or program modules running on a computing system such as those described herein and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Referring to FIG. 5, operation 501 illustrates attaching a lens assembly to a fit assembly. In an embodiment, the lens assembly having an enclosure having a rigid frame, the lens assembly comprises a front visor lens and a back visor lens. In an embodiment, the lens assembly encloses one or more devices configured to provide functions of the head-mounted extended reality device. In an embodiment, the lens assembly has a first standard attachment interface for attachment to the fit assembly. In an embodiment, the fit assembly is configured for fitting on a user when attached to the lens assembly. In an embodiment, the fit assembly has second standard attachment interface for attachment to the lens assembly. In an embodiment, the attaching the lens assembly to the fit assembly comprises attaching the lens assembly to the fit assembly so as to cause the first standard attachment interface to attach to the second standard attachment interface Operation 501 may be followed by operation 503. Operation 503 illustrates attaching an auxiliary assembly to the fit assembly. In an embodiment, the fit assembly further has a third standard attachment interface for attachment to the auxiliary assembly, the fit assembly further has a third standard attachment interface for attachment to the auxiliary assembly, and wherein the auxiliary assembly has a fourth standard interface for attachment to the fit assembly, wherein the auxiliary assembly has a fourth standard interface for attachment to the fit assembly. In an embodiment, the attaching the auxiliary assembly to the fit assembly comprises attaching the auxiliary assembly to the fit assembly so as to cause the third standard attachment interface to attach to the fourth standard attachment interface.

The disclosure presented herein also encompasses the subject matter set forth in the following clauses:

Clause 1: A head-mounted extended reality device comprising:

an enclosure having a rigid frame;

a lens assembly comprising a front visor lens and a back visor lens, the lens assembly enclosing one or more devices configured to provide functionality of the head-mounted extended reality, the lens assembly having a first standard attachment interface for attachment to a fit assembly; and a fit assembly configured for fitting on a user when attached to the lens assembly, the fit assembly having second standard attachment interface for attachment to the lens assembly.

Clause 2: The head-mounted extended reality device of clause 1, wherein the fit assembly further has a third standard attachment interface for attachment to an auxiliary assembly.

Clause 3: The head-mounted extended reality device of any of clauses 1-2, further comprising the auxiliary assembly, the auxiliary assembly having a fourth standard interface for attachment to the fit assembly.

Clause 4: The head-mounted extended reality device of any of clauses 1-3, wherein the lens assembly encloses one or more of sensors, waveguide optics, display devices, or projection devices.

Clause 5: The head-mounted extended reality device of any of clauses 1-4, wherein the front visor lens is configured to provide dimming for holographic displays.

Clause 6: The head-mounted extended reality device of any of clauses 1-5, wherein the fit assembly comprises one or more of a headband, VR headset, eyeglass temples, or helmet.

Clause 7: The head-mounted extended reality device of any of clauses 1-6, wherein the auxiliary assembly is configured to provide one or more of compute, storage, or power resources.

Clause 8: A head-mounted extended reality device comprising:

an enclosure having a rigid frame; and a lens assembly comprising a front visor lens and a back visor lens, the lens assembly enclosing one or more devices configured to provide functions of the head-mounted extended reality device, the lens assembly having a first standard attachment interface for attachment to a fit assembly configured for fitting on a user when attached to the lens assembly, the fit assembly having a second standard attachment interface for attachment to the lens assembly.

Clause 9: The head-mounted extended reality device of clause 8, further comprising the fit assembly, wherein the fit assembly is attached to the lens assembly via the first and second attachment interfaces.

Clause 10: The head-mounted extended reality device of any of clauses 8 and 9, wherein the fit assembly further has a third standard attachment interface for attachment to an auxiliary assembly.

Clause 11: The head-mounted extended reality device of any of clauses 8-10, further comprising the auxiliary assembly, the auxiliary assembly having a fourth standard interface for attachment to the fit assembly.

Clause 12: The head-mounted extended reality device of any of clauses 8-11, wherein the auxiliary assembly is configured to provide one or more of compute, storage, or power resources.

Clause 13: The head-mounted extended reality device of any of clauses 8-12, wherein the lens assembly encloses one or more of sensors, waveguide optics, display devices, or projection devices.

Clause 14: The head-mounted extended reality device of any of clauses 8-13, wherein the front visor lens is configured to provide dimming for holographic displays.

Clause 15: The head-mounted extended reality device of any of clauses 8-14, wherein the fit assembly comprises one or more of a headband, VR headset, eyeglass temples, or helmet.

Clause 16: A method for configuring a head-mounted extended reality device, the method comprising:

attaching a lens assembly to a fit assembly, the lens assembly having an enclosure having a rigid frame, the lens assembly comprising a front visor lens and a back visor lens, the lens assembly enclosing one or more devices configured to provide functions of the head-mounted extended reality device, the lens assembly having a first standard attachment interface for attachment to the fit assembly;

wherein the fit assembly is configured for fitting on a user when attached to the lens assembly, the fit assembly having a second standard attachment interface for attachment to the lens assembly;

wherein the attaching the lens assembly to the fit assembly comprises attaching the lens assembly to the fit assembly so as to cause the first standard attachment interface to attach to the second standard attachment interface; and attaching an auxiliary assembly to the fit assembly, wherein the fit assembly further has a third standard attachment interface for attachment to the auxiliary assembly, and wherein the auxiliary assembly has a fourth standard interface for attachment to the fit assembly;

wherein the attaching the auxiliary assembly to the fit assembly comprises attaching the auxiliary assembly to the fit assembly so as to cause the third standard attachment interface to attach to the fourth standard attachment interface.

Clause 17: The method of clause 16, wherein the lens assembly encloses one or more of sensors, waveguide optics, display devices, or projection devices.

Clause 18: The method of any of clauses 16 and 17, wherein the front visor lens is configured to provide dimming for holographic displays.

Clause 19: The method of any of the clauses 16-18, wherein the fit assembly comprises one or more of a headband, VR headset, eyeglass temples, or helmet.

Clause 20: The method of any of the clauses 16-19, wherein the auxiliary assembly is configured to provide one or more of compute, storage, or power resources.

What is claimed is:

1. A head-mounted extended reality device comprising:
an enclosure having a rigid frame;
a lens assembly comprising a front visor lens and a back visor lens, the lens assembly enclosing one or more devices configured to provide functionality of the head-mounted extended reality, the lens assembly having a first standard attachment interface for attachment to a plurality of fit assemblies that are removably attachable via the first standard attachment interface; and
a first fit assembly of the plurality of fit assemblies, wherein each of the plurality of fit assemblies are configured for fitting on a user when attached to the lens assembly and wherein each of the plurality of fit assemblies have a second standard attachment interface for removable attachment to a plurality of lens assemblies.

2. The head-mounted extended reality device of claim 1, wherein the plurality of fit assemblies further have a third standard attachment interface for attachment to an auxiliary assembly.

3. The head-mounted extended reality device of claim 2, further comprising the auxiliary assembly, the auxiliary assembly having a fourth standard interface for attachment to the plurality of fit assemblies.

4. The head-mounted extended reality device of claim 1, wherein the lens assembly encloses one or more of sensors, waveguide optics, display devices, or projection devices.

5. The head-mounted extended reality device of claim 4, wherein the front visor lens is configured to provide dimming for holographic displays.

6. The head-mounted extended reality device of claim 1, wherein the plurality of fit assemblies comprise one or more of a headband, VR headset, eyeglass temples, or helmet.

7. The head-mounted extended reality device of claim 3, wherein the auxiliary assembly is configured to provide one or more of compute, storage, or power resources.

8. A head-mounted extended reality device comprising:
an enclosure having a rigid frame; and
a lens assembly comprising a front visor lens and a back visor lens, the lens assembly enclosing one or more devices configured to provide functions of the head-mounted extended reality device, the lens assembly having a first standard attachment interface for attachment to a plurality of fit assemblies that are removably attachable via the first standard attachment interface, the plurality of fit assemblies configured for fitting on a user when attached to the lens assembly, the plurality of fit assemblies having a second standard attachment interface for attachment to the lens assembly.

9. The head-mounted extended reality of claim 8, further comprising the fit assembly, wherein the plurality of fit assemblies are attachable the lens assembly via the first and second attachment interfaces.

10. The head-mounted extended reality of claim 9, wherein the plurality of fit assemblies further have a third standard attachment interface for attachment to an auxiliary assembly.

11. The head-mounted extended reality device of claim 10, further comprising the auxiliary assembly, the auxiliary assembly having a fourth standard interface for attachment to the plurality of fit assemblies.

12. The head-mounted extended reality device of claim 11, wherein the auxiliary assembly is configured to provide one or more of compute, storage, or power resources.

13. The head-mounted extended reality device of claim 8, wherein the lens assembly encloses one or more of sensors, waveguide optics, display devices, or projection devices.

14. The head-mounted extended reality device of claim 13, wherein the front visor lens is configured to provide dimming for holographic displays.

15. The head-mounted extended reality device of claim 9, wherein the plurality of fit assemblies comprise one or more of a headband, VR headset, eyeglass temples, or helmet.

16. A method for configuring a head-mounted extended reality device, the method comprising:
attaching a lens assembly to one of a plurality of fit assemblies, the lens assembly having an enclosure having a rigid frame, the lens assembly comprising a front visor lens and a back visor lens, the lens assembly enclosing one or more devices configured to provide functions of the head-mounted extended reality device, the lens assembly having a first standard attachment interface for attachment to the plurality of fit assemblies, wherein the plurality of fit assemblies that are removably attachable via the first standard attachment interface;
wherein the plurality of fit assemblies are configured for fitting on a user when attached to the lens assembly, the fit assembly having a second standard attachment interface for attachment to the lens assembly;
wherein the attaching the lens assembly to the one of the plurality of fit assemblies comprises attaching the lens assembly to the one of the plurality of fit assemblies so as to cause the first standard attachment interface to attach to the second standard attachment interface;
attaching an auxiliary assembly to the one of the plurality of fit assemblies, wherein the fit assemblies further have a third standard attachment interface for attachment to the auxiliary assembly, and wherein the auxiliary assembly has a fourth standard interface for attachment to the one of the plurality of fit assemblies; and
wherein the attaching the auxiliary assembly to the one of the plurality of fit assemblies comprises attaching the auxiliary assembly to the one of the plurality of fit assemblies so as to cause the third standard attachment interface to attach to the fourth standard attachment interface.

17. The method of claim 16, wherein the lens assembly encloses one or more of sensors, waveguide optics, display devices, or projection devices.

18. The method of claim 17, wherein the front visor lens is configured to provide dimming for holographic displays.

19. The method of claim 16, wherein the fit assembly comprises one or more of a headband, VR headset, eyeglass temples, or helmet.

20. The method of claim 16, wherein the auxiliary assembly is configured to provide one or more of compute, storage, or power resources.

* * * * *